United States Patent Office 3,646,221
Patented Feb. 29, 1972

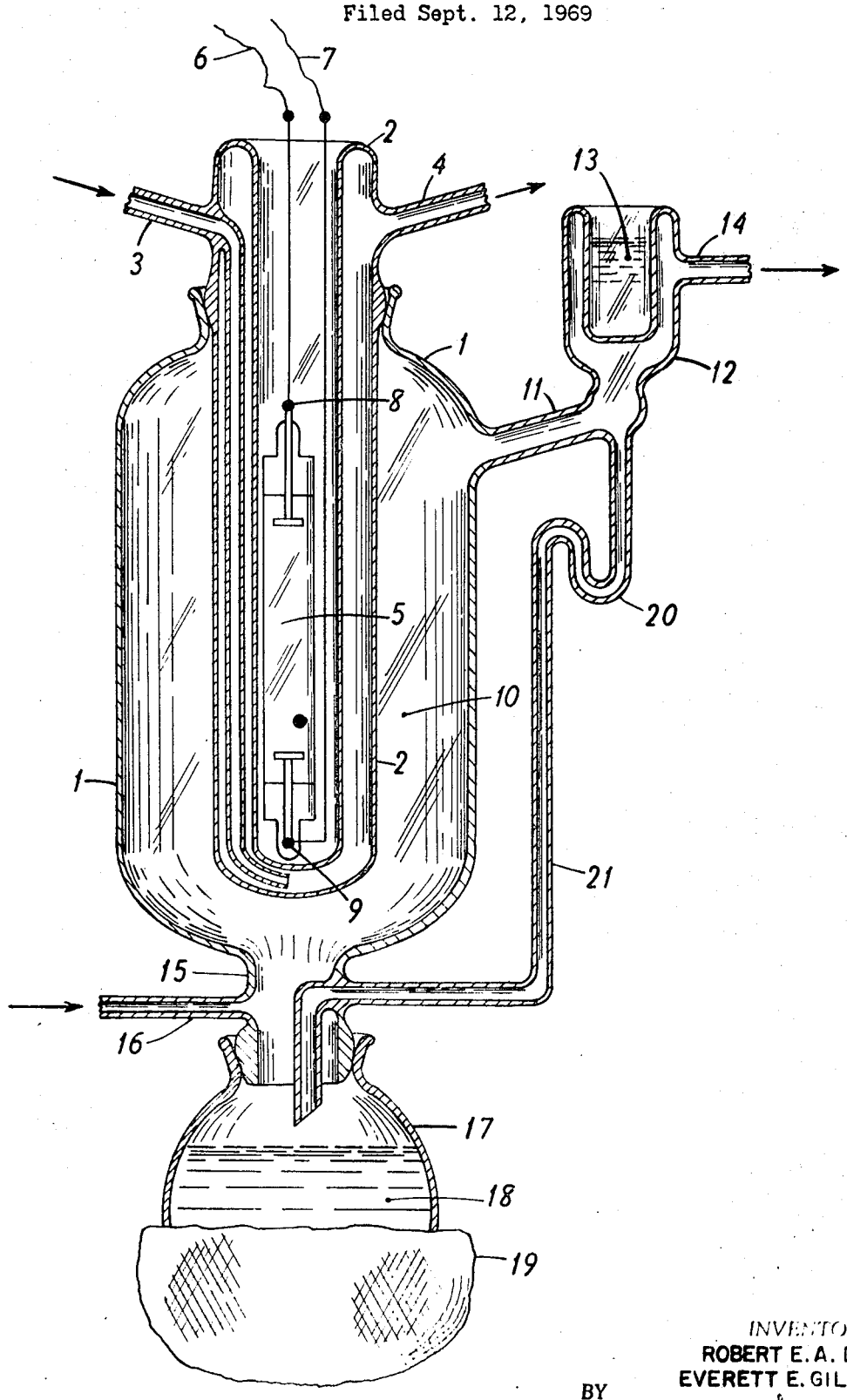

3,646,221
BIS(TRIFLUOROMETHYLTHIO) FLUOROBUTANES
Robert E. A. Dear and Everett E. Gilbert, Morris Township, Morris County, N.J., assignors to Allied Chemical Corporation, New York, N.Y.
Filed Sept. 12, 1969, Ser. No. 857,428
Int. Cl. C07c 149/16
U.S. Cl. 260—609 A
4 Claims

ABSTRACT OF THE DISCLOSURE

Bis(trifluoromethylthio) fluorobutanes useful as thermally stable dielectric coolants or insecticidal fumigants, and process for preparing them by subjecting a vaporous mixture of bis(trifluoromethyl)disulfide and certain fluoroethylenes to ultraviolet light in the wave length range between about 2000 A. and about 3600 A. at temperatures of at least about 35° C.

---

This invention relates to a new method for preparing bis(trifluoromethylthio) fluorobutanes and to new bis (trifluoromethylthio) fluorobutanes thus produced.

In the past, saturated organic compounds containing one or more tetrafluoroethylene groups per molecule have been prepared by heating an organic sulfur compound such as dimethyl disulfide with a completely halogenated fluoroethylene such as tetrafluoroethylene, at a temperature ranging from 75° C. to 350° C. in the presence of a peroxy catalyst. This procedure was effective in producing compounds of the character of

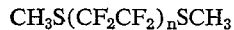

$$CH_3S(CF_2CF_2)_nSCH_3$$

n being an integer from 1 to 25, wherein the organic sulfide used was a hydrocarbon sulfide, i.e. a non-halogenated sulfide.

However, when a completely halogenated disulfide such as bis(trifluoromethyl)disulfide is substituted for dimethyl disulfide in the prior art method referred to above the corresponding bis(trifluoromethylthio) fluoroalkane is not obtained, and only high molecular weight polymers result, which contain no sulfur.

It is an object of the present invention to provide a process for preparing bis(trifluoromethylthio) fluorobutanes in substantial yields and high purity by a simple procedure adapted for commercial operation.

This and other objects are accomplished according to our invention wherein a mixture of bis(trifluoromethyl) disulfide and fluoroethylene containing at least two fluorine atoms are subjected to ultraviolet light in the wave length range between about 2000 A. and about 3600 A. at a temperature of at least about 35° C., preferably between about 35° C. and about 100° C.

The reaction is preferably carried out in the vapor phase since the fluoroethylene is a gas at normal atmospheric conditions, and the bis(trifluoromethyl)disulfide is a low boiling (B.P. 34° C.), easily vaporizable liquid.

The ultraviolet light used in the irradiation should be of wave lengths within the range specified, and preferably should emit a substantial amount of radiation in the region of about 2330 A. since this is the wave length at which bis(trifluoromethyl)-disulfide has maximum ultraviolet absorption. The reaction is usually substantially complete in a period of no more than about 5 hours, more usually in a period of about 1 hour to about 3 hours.

The reaction according to our invention proceeds as follows:

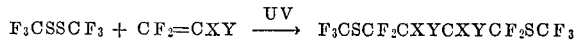

$$F_3CSSCF_3 + CF_2\!=\!CXY \xrightarrow{UV} F_3CSCF_2CXYCXYCF_2SCF_3$$

wherein X and Y are hydrogen, fluorine or chlorine with the proviso that only one of X and Y can be chlorine and that when X is hydrogen, Y is also hydrogen.

Specific fluoroethylenes usable as starting materials in our reaction include the following:

(I) Tetrafluoroethylene, $CF_2\!=\!CF_2$ (II) Trifluoromonochloroethylene, $CF_2\!=\!CFCl$ (III) Difluoroethylene, $CF_2\!=\!CH_2$ The process of our invention can be carried out either batchwise or continuously, and appropriate apparatus is readily available for carrying out our photochemical reaction in either manner using immersion type ultraviolet sources.

In the drawing, the single figure depicts, in half section, an apparatus suitable for carrying out our process batch-wise in the vapor phase.

In carrying out the process, the bis(trifluoromethyl) disulfide is preferably vaporized and is mixed with the gaseous fluoroethylene and the mixture irradiated at temperatures of at least about 35° C. with ultraviolet light in the wave length range between about 2000 R. and about 3600 A.

The ultraviolet light can be supplied in any desired manner. For example, if the reaction vessel is of ultraviolet light-transparent material such as quartz, the UV source can be positioned outside the vessel. Preferably the ultraviolet light source is positioned inside the reaction vessel, for example encased in a water cooled quartz well or other conventional device for supplying ultraviolet irradiation.

In the preferred vapor phase reaction of our process, a mixture of fluoroethylene gas and vaporized bis(trifluoromethyl)disulfide is irradiated with ultraviolet light of the indicated wave length, either in a continuous reactor through which the mixture is passed, or in a batch reactor in which the mixture is maintained in an irradiated zone at a temperature above the 34° C. boiling point of the bis(trifluoromethyl)disulfide, i.e. sufficiently high to maintain the reactants in the vapor phase.

In examplary vapor phase reaction procedures, suitable for batchwise reactions, we may utilize the apparatus shown in the drawing.

Referring to the drawing, in the single figure, numeral 1 represents a vapor phase batch reactor. Numeral 2 represents a water-cooled quartz well within the reactor equipped with liquid coolant inlet at 3 and a liquid outlet at 4. Positioned within the liquid cooled well 2, is ultraviolet lamp 5 with electrical terminals 6 and 7, connected respectively to ends 8 and 9 thereof and to a source of electric current (not shown). Reactor 1 is equipped at the bottom with neck 15 connecting reaction zone 10 with gas inlet 16 located at about the mid-point of said neck. Removably attached to the end of reactor neck 15 is vaporizing vessel 17 shown partially filled with liquid reactant 18 and equipped with heating mantle 19. A vapor exit 11 is provided near the top of the reactor, said exit being connected to a cold trap 12 containing Dry Ice 13 and equipped with vapor exit 14. Trap 12 is connected by line 21 having surge elbow 20 to vaporizing vessel 17 to provide return of condensed reactant and reaction product to the vaporization vessel.

The compounds produced according to our invention are novel and are useful for a number of purposes. The perfluoro compounds, as well as the polyfluorocompounds having no more than 2 chlorine atoms, are thermally quite stable and hence are useful as inert liquid reaction media, and as dielectric coolants. Compositions of the invention in this category are designated by the following general formula:

$$F_3CSCF_2CFQCFZCF_2SCF_3$$

wherein Q and Z represent the same or different members selected from fluorine and chlorine.

The single compound of our invention which contains hydrogen, namely $F_3CSCF_2CH_2CH_2CF_2SCF_3$, is less thermally stable than the perhalogenated compounds recited above. It has been found to be a valuable insecticidal fumigant useful in combatting many common insects including confused flour beetle (*Tribolium confusum*), black carpet beetle (*Attagenus piceus*) yellow meal worm (*Tenebrio molitar*), as well as nematodes (*Panagrellus redivivus*).

The following specific examples further illustrate our invention.

EXAMPLE 1

Bis(trifluoromethyl)disulfide (24 grams, 0.124 mol) was placed in a round bottom flask having a neck connected to the bottom of a vapor phase reactor similar to that shown in the drawing. The reactor was provided with a liquid cooled well having positioned therein a quartz mercury vapor lamp (Hanovia 450W) delivering ultraviolet light of wave lengths in the range between 2000 A. and 3600 A., and having a gas inlet near the bottom of the reactor and a vapor outlet near the top thereof leading to a cold trap containing Dry Ice. The bis(trifluoromethyl) disulfide (B.P. 34° C.) was heated and refluxed from the flask into the reaction zone of the reactor while tetrafluoroethylene gas was concurrently passed into the reaction zone through the gas inlet at a rate of approximately 3 liters per hour (approximately 13.5 grams per hour). The mixture was irradiated with ultraviolet light from the lamp, whereupon reaction took place, the resulting liquid product being condensed in the cold trap and returned to the refluxing liquid. The temperature of the refluxing liquid was noted at intervals, and over a period of two hours it rose from 36° C. to 71° C. The vapor temperature in the reactor was therefore also within this range. When no further temperature rise occurred, at this point the irradiation was discontinued and liquid in the flask was removed and distilled through a spinning band column yielding 16 grams (a 39.3% yield) of a main fraction of 1,4-bis(trifluoromethylthio) perfluorobutane, together with 4 grams unreacted $CF_3SSCF_3$ and 5 grams of $CF_3SCF_2CF_2SCF_3$, B.P. 80–81° C.

The identity of the above compounds was confirmed by F N.M.R., by mass spectroscopy and by elemental analysis, the latter showing:

Calcd. for $CF_3SCF_2CF_2SCF_3$ (percent): C, 15.90; S, 21.22. Found (percent): C, 15.72; S, 20.90.

Calcd. for $CF_3SCF_2CF_2CF_2CF_2SCF_3$ (percent): C, 17.92; S, 15.94. Found (percent): C, 18.19; S, 16.05.

EXAMPLE 2

In the same manner as described in Example 1, 25 grams (0.124 mol) of bis(trifluoromethyl)disulfide were reacted with 30 grams (0.258 mol) of chlorotrifluoroethylene by irradiating the mixture over a 1¾ hour period during which the temperature of refluxing liquid rose from 35° C. to 84° C. when refluxing and irradiation were discontinued. The contents of the reflux flask were then distilled and yielded as a major fraction, 22.9 grams (a 52% yield) of 1,4-bis(trifluoromethylthio)-1,1,2,3,4,4-hexafluoro-2,3-dichlorobutane,

B.P. 177° C. The identity of the bis(trifluoromethylthio) hexafluorodichlorobutane was shown by F. N.M.R. examination to be symmetrical. No trace of other possible isomers was found. Elemental analysis showed:

Calcd. (percent): C, 16.56; S, 14.74; Cl, 16.30. Found (percent): C, 16.87; S, 14.75; Cl, 16.31.

EXAMPLE 3

In the same manner as described in Example 1, 202 grams of bis(trifluoromethyl)disulfide were reacted with 64 grams of difluoroethylene ($CF_2$=$CH_2$) over a period of one hour and 50 minutes during which the temperature of the refluxing liquid rose from 35° C. to 110° C. The liquid in the flask was then removed and distilled. At atmospheric pressure distillation was accompanied by decomposition. Distillation at 85° C. under 75 mm. Hg yielded 11.2 grams of 1,4-bis(trifluoromethylthio)-1,1,4,4-tetrafluorobutane, $F_3CSCF_2CH_2CH_2CF_2SCF_3$. Elemental analysis showed:

Calcd. (percent): C, 16.56; S, 14.74; Cl, 16.30. Found (percent): C, 22.13; H, 1.24; S, 19.25.

EXAMPLE 4

The 1,4-bis(trifluoromethylthio) perfluorobutane of Example 1 and the 1,4-bis(trifluoromethylthio) hexafluorodichlorobutane of Example 2 were tested for thermal stability by storing samples of the compounds in sealed Pyrex glass tubes at 200° C. for 7 days. Both samples remained unchanged during the entire course of the test evidencing complete thermal stability under conditions of the test.

A sample of 1,4-bis(trifluoromethylthio) tetrafluorobutane of Example 3 was similarly tested and failed by turning black after 24 hours.

When tested at 250° C. the compound of Example 1

$$(F_3CS(CF_2CF_2CF_2CF_2)SCF_3)$$

was stable for 7 days; when tested at 350° C. the compound of Example 1 decomposed completely to octafluorothiolane.

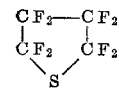

over a period of 7 days. The resulting octafluorothiolane is stable during, and at the end of a 7 day exposure to a temperature of 350° C.

The compound of Example 1 therefore is further useful as a starting material for the production of octafluorothiolane which in turn is useful as a fire extinguishing liquid.

EXAMPLE 5

The 1,4 - bis(trifluoromethylthio) - 1,1,4,4 - octafluorobutane of Example 3 was tested as an insecticidal fumigant against confused flour beetle (CFB), black carpet beetle (BCB), yellow meal worm (YMW) and nematodes (NEM) by placing 10 insects of each species (except the nematodes, of which about 100 were used) in 1.5 inch diameter salve tins with perforated lids. A small amount of appropriate food was placed in each tin. The tins were placed in gallon jars and appropriate dosages of about 0.05 ml. of the toxicant per jar were placed on cellucotton wads in small open containers and placed in the jars, thus providing vapor concentrations of toxicant in the jar of about 1 lb. toxicant vapor per 1000 square feet of air in the jars. After 24 hours exposure the insect containers were removed from the jars, and mortality counts made immediately and at 1 day intervals for 7 days. Mortality results after 7 days are shown in Table I below.

TABLE I 7 day mortality in percent dead at dosage 1 lb. $CF_3SCF_2CH_2CH_2CF_2SCF_3$ per 1000 cu. ft.

| | Percent kill |
|---|---|
| Confused flour beetle (adults) | 100 |
| Black carpet beetle (larvae) | 100 |
| Yellow meal worm (larvae) | 60 |
| Nematodes | 100 |

We claim:
1. Bis(trifluoromethylthio) fluorobutanes of the formula

$$F_3CSCF_2CXYCXYCF_2SCF_3$$

wherein X and Y are the same or different members selected from the group consisting of hydrogen, fluorine and chlorine with the provisos that only one of X and Y is chlorine and that when X is hydrogen, Y is also hydrogen.

2. 1,4-bis(trifluoromethylthio) perfluorobutane of the formula $$F_3CSCF_2CF_2CF_2CF_2SCF_3$$

3. 1,4 - bis(trifluoromethylthio)-1,1,2,3,4,4-hexafluoro-2,3-dichlorobutane of the formula $$F_3CSCF_2CFClCFClCF_2SCF_3$$

4. 1,4 - bis(trifluoromethylthio)-1,1,4,4-tetrafluorobutane of the formula $$F_3CSCF_2CH_2CH_2CF_2SCF_3$$

References Cited
UNITED STATES PATENTS 2,730,543   5/1950   Rendall et al. _____ 260—609 A CHARLES B. PARKER, Primary Examiner D. R. PHILLIPS, Assistant Examiner

204—158 HE; 252—66; 260—332.5; 424—337